US012529719B2

(12) United States Patent
Haile

(10) Patent No.: US 12,529,719 B2
(45) Date of Patent: Jan. 20, 2026

(54) SATELLITE FEED ANTENNA TESTING

(71) Applicant: The Boeing Company, Chicago, IL (US)

(72) Inventor: Amanuel Haile, El Segundo, CA (US)

(73) Assignee: The Boeing Company, Arlington, VA (US)

( * ) Notice: Subject to any disclaimer, the term of this patent is extended or adjusted under 35 U.S.C. 154(b) by 499 days.

(21) Appl. No.: 18/057,623

(22) Filed: Nov. 21, 2022

(65) Prior Publication Data

US 2024/0168072 A1 May 23, 2024

(51) Int. Cl.
*G01R 29/08* (2006.01)
*G01R 29/10* (2006.01)

(52) U.S. Cl.
CPC ..... *G01R 29/0871* (2013.01); *G01R 29/0878* (2013.01); *G01R 29/0892* (2013.01); *G01R 29/10* (2013.01)

(58) Field of Classification Search
CPC ........ H01Q 1/28; H01Q 1/247; H01Q 19/132; H01Q 21/0025; H01Q 21/24; H01Q 3/40; H01Q 25/001; H01Q 1/06; H01Q 3/247; H01Q 5/50; H01Q 19/17; H01Q 13/02; H01Q 3/267; H01Q 13/0258; H01Q 3/08; H04B 7/2041; H04B 7/0617; H04B 7/18517; H04B 7/0413; H04B 7/18513; H04B 7/18515; H04B 10/118; H04B 7/024; H04B 7/18508; H04B 7/18534; H04B 7/1858; H04B 7/18586; H04B 7/18589;

(Continued)

(56) References Cited

U.S. PATENT DOCUMENTS

| | | | | |
|---|---|---|---|---|
| 5,530,449 A * | 6/1996 | Wachs | ................... | H01Q 3/267 342/372 |
| 8,018,371 B1 * | 9/2011 | Paschen | ................ | G01S 13/003 342/195 |

(Continued)

FOREIGN PATENT DOCUMENTS

| | | |
|---|---|---|
| CN | 212433285 U | 1/2021 |
| EP | 2320240 A2 | 5/2011 |

OTHER PUBLICATIONS

C.P. Fischer, "A Cylindrical Near-Field Test Facility for Large Satellite Antennas", European Microwave Conference, 1983., 13th IEEE, Piscataway, NJ, USA, Oct. 1, 2006, pp. 829-834.

(Continued)

*Primary Examiner* — Golam Sorowar
(74) *Attorney, Agent, or Firm* — Harrity & Harrity, LLP

(57) ABSTRACT

A method for testing a feed antenna of a satellite includes generating a source signal internal to the satellite. The satellite includes the feed antenna disposed on an exterior of the satellite. The method further includes generating a transmit signal external to the satellite by a broadcast of the source signal with the feed antenna, generating a test signal with a probe in response to a first reception of a test portion of the transmit signal. The probe is external to the satellite. The method includes generating a reference signal with a reference horn in response to a second reception of a reference portion of the transmit signal. The reference horn is external to the satellite. The method includes determining an amplitude and a phase of the transmit signal based on the test signal relative to the reference signal.

20 Claims, 5 Drawing Sheets

(58) Field of Classification Search
CPC ....... H04B 7/204; H04B 17/12; H04W 84/06; H04W 16/26; H04W 16/28; H04W 4/00; H04W 40/20; H04W 76/10; H04W 16/02; H04W 16/14; H04W 74/08; H04W 84/025
See application file for complete search history.

(56) References Cited

U.S. PATENT DOCUMENTS

| | | | | |
|---|---|---|---|---|
| 2011/0111692 | A1* | 5/2011 | Grotz | H04B 1/18 455/3.02 |
| 2012/0001810 | A1* | 1/2012 | Soualle | G01S 19/02 343/703 |
| 2018/0164407 | A1* | 6/2018 | Schuman | G01S 13/44 |
| 2019/0327124 | A1* | 10/2019 | Lai | G01S 5/017 |
| 2020/0313757 | A1* | 10/2020 | Oster | H04B 7/18519 |
| 2021/0341528 | A1* | 11/2021 | Sanchez Hernandez | H01Q 1/38 |
| 2022/0149900 | A1* | 5/2022 | Llorens Del Rio | H04B 17/18 |
| 2023/0029048 | A1* | 1/2023 | Hahn, III | H04B 17/0085 |

OTHER PUBLICATIONS

Tena Sanchez Reuben et al., "A Referenceless Antenna Measurement System Based on Software-Defined Radio [Measurements Corner]", IEEE Antennas and Propagation Magazine, IEEE Service Center, Piscataway, NJ, USA, vol. 62, No. 5, Oct. 1, 2020, pp. 108-118.

Sanchez, R. T. et al., "Use of Software Defined Radio Receivers for Antenna Measurements", 2019 Photonics & Electromagnetics Research Symposium—Spring, IEEE, Jun. 17, 2019, pp. 1862-1869.

Kalis, Kyriakos et al., "The Effectes of a Generator's Active Input Reflection Coefficient in Antenna Gain Measurements", 2019 13th European Conference on Antennas and Propagation, European Association on Antennas and Propagation, Mar. 31, 2019, pp. 1-5.

Vokurka, V. J. et al., "Advanced Antenna Measurements", European Microwave Conference, 1984, 14th IEEE, Piscataway, NJ, USA, Oct. 1, 1984, pp. 60-70.

* cited by examiner

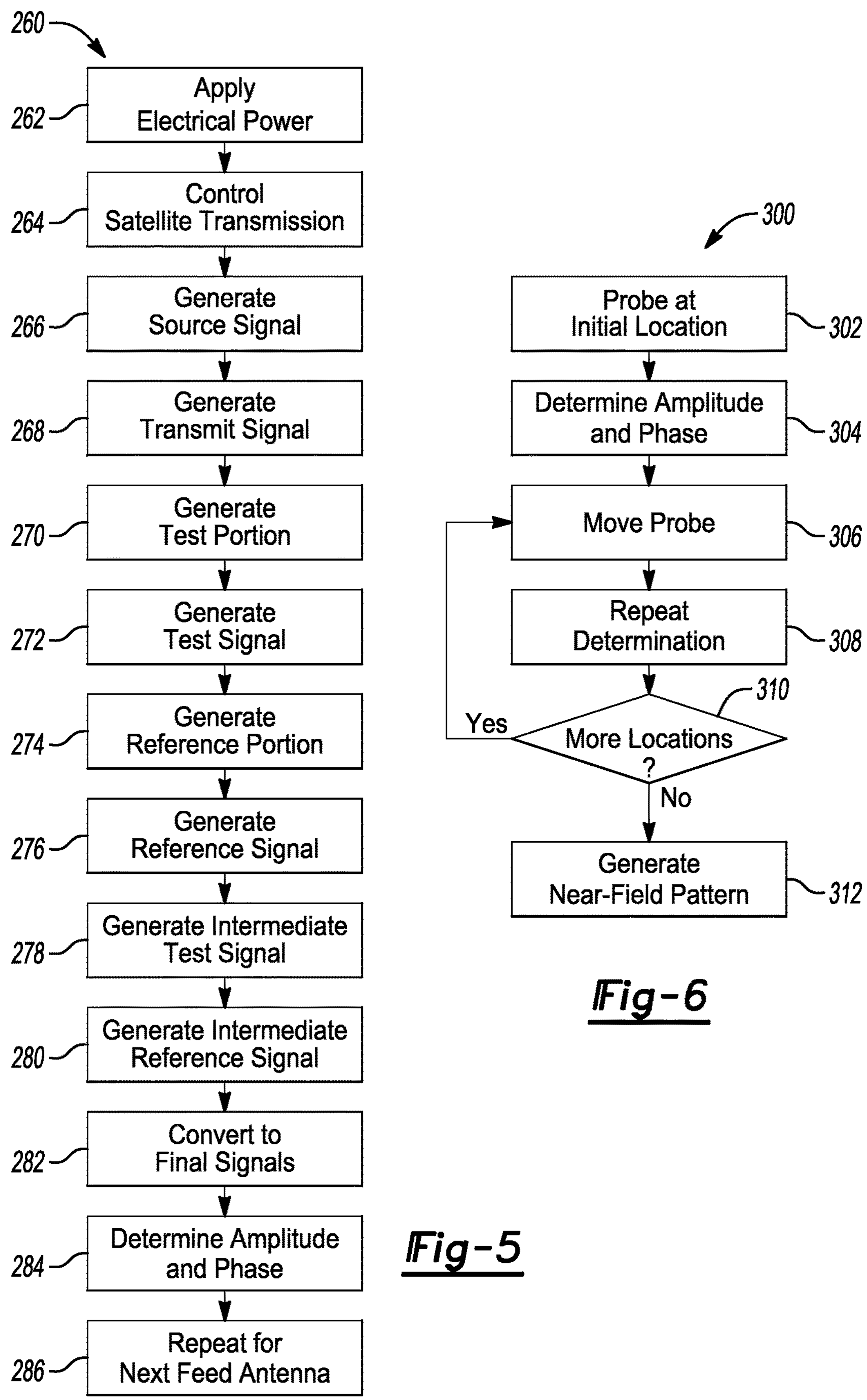
260
Apply Electrical Power
262
Control Satellite Transmission
264
Generate Source Signal
266
Generate Transmit Signal
268
Generate Test Portion
270
Generate Test Signal
272
Generate Reference Portion
274
Generate Reference Signal
276
Generate Intermediate Test Signal
278
Generate Intermediate Reference Signal
280
Convert to Final Signals
282
Determine Amplitude and Phase
284
Repeat for Next Feed Antenna
286
Fig-5
300
Probe at Initial Location
302
Determine Amplitude and Phase
304
Move Probe
306
Repeat Determination
308
More Locations ?
310
Yes
No
Generate Near-Field Pattern
312
Fig-6

SATELLITE FEED ANTENNA TESTING

TECHNICAL FIELD

The disclosure relates generally to satellite testing, and in particular, to satellite feed antenna testing.

BACKGROUND

Various antenna field measurement techniques use a radio-frequency source of a test bench to generate a source signal. A directional coupler obtains a reference signal from the source signal and routes the remaining source signal to a multiport switch. The multiport switch multiplexes the source signal to an antenna under test of the satellite. The antenna under test subsequently broadcasts a transmit signal to a receive antenna of the test bench. The receive antenna converts the transmit signal into a test signal. The test signal is a measurement of the field in front of the antenna under test. The measurements are repeated for each antenna of the satellite, often resulting in hundreds of cables being routed between the multiport switch and the antennas of the satellite during the tests. Installing and removing the hundreds of cables is manually intensive and time consuming.

Accordingly, those skilled in the art continue with research and development efforts in the field of satellite antenna testing using simplified connections between a test bench and the antennas under test.

SUMMARY

A method for testing a feed antenna of a satellite is provided herein. The method includes generating a source signal internal to the satellite. The satellite includes the feed antenna disposed on an exterior of the satellite. The method further includes generating a transmit signal external to the satellite by a broadcast of the source signal with the feed antenna, and generating a test signal with a probe in response to a first reception of a test portion of the transmit signal. The probe is external to the satellite, and generating a reference signal with a reference horn in response to a second reception of a reference portion of the transmit signal. The reference horn is external to the satellite. The method includes determining an amplitude and a phase of the transmit signal based on the test signal relative to the reference signal.

In one or more embodiments, the method includes generating the test portion of the transmit signal by a first reflection of the transmit signal from a reflector in a first direction toward the probe. The reflector is disposed on the exterior of the satellite. The method includes generating the reference portion of the transmit signal by a second reflection of the transmit signal from the reflector in a second direction toward the reference horn. The first direction is different than the second direction.

In one or more embodiments of the method, the second reception made by the reference horn is receiving a side lobe of the transmit signal.

In one or more embodiments, the method includes generating an intermediate reference signal by mixing the reference signal to an intermediate frequency, and generating an intermediate test signal by mixing the test signal to the intermediate frequency.

In one or more embodiments of the method, the amplitude and the phase of the transmit signal are determined by a comparison of the intermediate test signal with the intermediate reference signal.

In one or more embodiments, the method includes moving the probe to a plurality of locations, repeating the determining of the amplitude and the phase of the transmit signal at the plurality of locations, and generating a near-field pattern of the feed antenna based on the amplitude and the phase of the transmit signal at the plurality of locations.

In one or more embodiments of the method, the reference horn and the antenna have different polarizations.

In one or more embodiments of the method, the satellite includes a plurality of the feed antennas, and the broadcast from each feed antenna of the plurality of the feed antennas is tested with the probe and the reference horn.

In one or more embodiments of the method, the plurality of the feed antennas is at least one-hundred feed antennas, and the satellite has at most a single reflector for the at least one-hundred feed antennas.

A test system is provided herein. The test system includes a satellite, a transmitter, a feed antenna, a probe, a reference horn, and a receiver. The transmitter is internal to the satellite and is operational to generate a source signal. The feed antenna is disposed on an exterior of the satellite and is operational to generate a transmit signal external to the satellite by a broadcast of the source signal. The probe is external to the satellite and is operational to generate a test signal in response to a first reception of a test portion of the transmit signal. The reference horn is external to the satellite and is operational to generate a reference signal in response to a second reception of a reference portion of the transmit signal. The receiver is operational to determine an amplitude and a phase of the transmit signal based on the test signal relative to the reference signal.

In one or more embodiments, the test system includes a reflector disposed on the exterior of the satellite and operational to generate the test portion of the transmit signal by a first reflection of the transmit signal in a first direction toward the probe, and generate the reference portion of the transmit signal by a second reflection of the transmit signal in a second direction toward the reference horn. The first direction is different than the second direction.

In one or more embodiments of the test system, the second reception made by the reference horn is receiving a side lobe of the transmit signal.

In one or more embodiments, the test system includes a first mixer operational to generate an intermediate reference signal by mixing the reference signal to an intermediate frequency, and a second mixer operational to generate an intermediate test signal by mixing the test signal to the intermediate frequency.

In one or more embodiments of the test system, the amplitude and the phase of the transmit signal are determined by a comparison of the intermediate test signal with the intermediate reference signal.

In one or more embodiments of the test system, the probe is moved to a plurality of locations, the determination of the amplitude and the phase of the transmit signal is repeated at the plurality of locations, and a near-field pattern of the feed antenna is based on the amplitude and the phase of the transmit signal at the plurality of locations.

In one or more embodiments of the test system, the reference horn and the antenna have different polarizations.

In one or more embodiments of the test system, the satellite includes a plurality of the feed antennas, and the broadcast from each feed antenna of the plurality of the feed antennas is tested with the probe and the reference horn.

In one or more embodiments of the test system, the plurality of the feed antennas is at least two-hundred feed antennas, and the satellite has at most a single reflector for the at least two-hundred feed antennas.

In one or more embodiments, the test system is characterized by a lack of a radio-frequency source external to the satellite, coupled to the satellite, and operational to generate a radio-frequency signal used to create the source signal transmitted by the satellite.

A test bench is provided herein, The test bench includes a probe, a reference horn, and a receiver. The probe is external to a satellite and is operational to generate a test signal in response to a first reception of a test portion of a transmit signal broadcast by the satellite. The reference horn is external to the satellite and is operational to generate a reference signal in response to a second reception of a reference portion of the transmit signal broadcast by the satellite. The receiver is operational to determine an amplitude and a phase of the transmit signal based on a comparison of the test signal with the reference signal. The test bench is characterized by a lack of a radio-frequency source external to the satellite, coupled to the satellite, and operational to generate a radio-frequency signal used to create a source signal transmitted by the satellite.

The above features and advantages, and other features and advantages of the present disclosure are readily apparent from the following detailed description of the best modes for carrying out the disclosure when taken in connection with the accompanying drawings.

BRIEF DESCRIPTION OF THE DRAWINGS

FIG. 5 is a flow diagram of a method for testing a satellite in accordance with one or more embodiments.

FIG. 6 is a flow diagram of a method for determining a near-field pattern of a feed antenna in accordance with one or more embodiments.

DETAILED DESCRIPTION

Embodiments of the present disclosure include a system and/or a method for testing multiple feed antennas of a satellite. The feed antennas are tested one at a time using a source signal generated internal to the satellite. The system/method utilizes a stationary reference horn that samples a transmit signal spillover from a reflector on the satellite (or side lobes of the transmit signal in situations where no reflector exists). A moveable near-field probe samples the transmit signal. An intermediate reference signal from the reference horn may be mixed to an intermediate frequency in a same manner as a test signal from the probe. The intermediate reference signal is subsequently compared with the intermediate frequency test signal at a receiver to obtain an amplitude measurement and a phase measurement. Placement of the reference horn is calculated from a geometry of the feed antenna currently under test. A polarization of the reference horn may be different than a feed antenna polarization. A circularly polarized feed antenna uses a linearly polarized reference horn. A linearly polarized feed antenna uses a circularly polarized reference horn.

Figure 1:
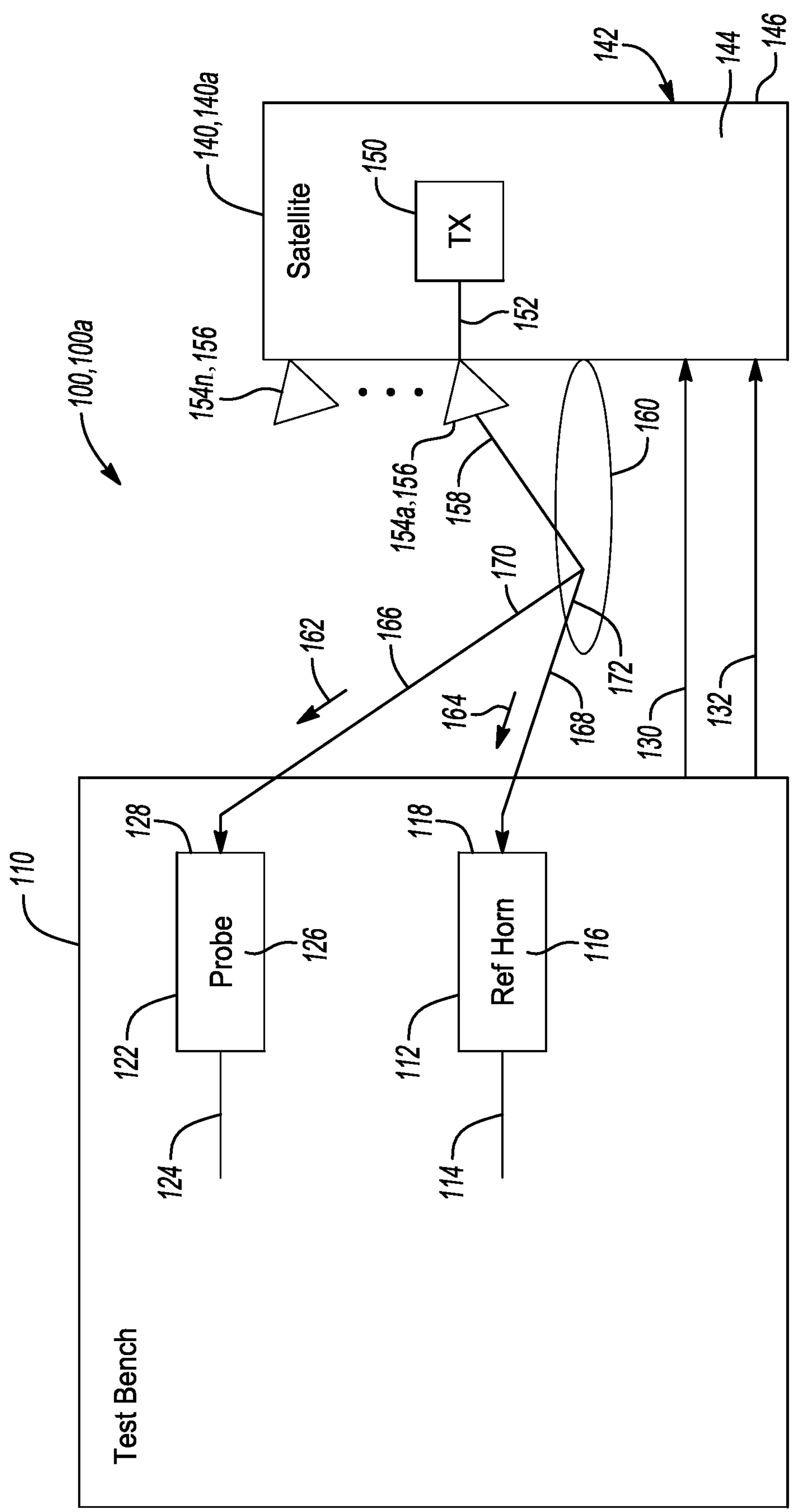
FIG. 1 is a schematic diagram of a test system involving a satellite with a reflector in accordance with one or more exemplary embodiments.

Referring to FIG. 1, a schematic diagram of an example test system 100 involving a satellite 140 with a reflector 160 is shown in accordance with one or more exemplary embodiments. The test system 100 (e.g., a first test system 100*a*) includes a test bench 110 and the satellite 140 (e.g., a first satellite 140*a*) having the reflector 160. The test bench 110 includes a reference horn 112 and a probe 122. The satellite 140 includes a housing 142, multiple transmitters 150 (one shown), and multiple feed antennas 154*a*-154*n*.

A power signal 130 is generated by the test bench 110 and transferred to the satellite 140. The power signal 130 may transfer electrical power appropriate for the satellite 140 to be operational. The test bench 110 also generates a control signal 132 received by the satellite 140. The control signal 132 instructs the satellite 140 to broadcast transmit signals 158 (one shown) from the feed antennas 154*a*-154*n*.

Source signals 152 (one shown) are generated by the transmitters 150 and routed to the feed antennas 154*a*-154*n*, one at a time. Selection of an antenna under test (e.g., feed antenna 154*a* is illustrated) is controlled by the control signal 132. The antenna under test broadcasts the received source signal 152 as the transmit signal 158. The transmit signal 158 conveys a carrier waveform. The transmit signal 158 may be reflected from the reflector 160 in at least two directions. In a first direction 162, the reflected portion of the transmit signal 158 is referred to as a test portion 166. The first direction 162 sends the test portion 166 to the probe 122. In a second direction 164, the reflected portion of the transmit signal 158 is referred to as a reference portion 168. The second direction 164 sends the reference portion 168 to the reference horn 112.

The probe 122 implements a moveable antenna that is external to the satellite 140. The probe 122 is operational to convert the test portion 166 of the transmit signal 158 into a test signal 124. Reception of the test portion 166 of the transmit signal 158 is referred to as a first reception 128. The probe 122 has a probe polarization 126. The probe polarization 126 may be linear (e.g., horizontal or vertical) or circular.

The reference horn 112 implements a fixed-position antenna that is external to the satellite 140. The reference horn 112 is operational to convert the reference portion 168 of the transmit signal 158 into a reference signal 114. Reception of the reference portion 168 of the transmit signal 158 is referred to as a second reception 118. The reference horn 112 has a horn polarization 116. The horn polarization 116 may be linear (e.g., horizontal or vertical) or circular. In various embodiments, the horn polarization 116 may match the probe polarization 126.

The housing 142 of the satellite 140 defines an interior 144 and an exterior 146. The interior 144 of the satellite 140 holds the transmitters 150. The feed horns are mounted on the exterior 146 of the satellite 140. The reflector 160 is also mounted on the exterior 146 of the satellite 140.

The transmitters 150 implement radio-frequency transmitters. The transmitters 150 are operational to generate the source signals 152. A source signal 152 is presented to the antenna under test. Selection of when to generate the source signal 152 and which feed antenna 154*a*-154*n* receives the source signal 152 is governed by the control signal 132.

Each feed antenna 154*a*-154*n* implements a directional radio-frequency antenna mounted on the exterior 146 of the satellite 140. The antenna under test is operational to broadcast a source signal 152 as the transmit signal 158. The transmit signal 158 is directed toward the reflector 160. The satellite 140 may include over 100 to 400 individual feed antenna 154*a*-154*n*. The feed antennas 154*a*-154*n* have a feed polarization 156. In various embodiments, the feed polarization 156 may be a linear polarization or a circular polarization. The feed polarization 156 of the feed antennas 154*a*-154*n* is generally different than the probe polarization 126 and the horn polarization 116.

The reflector 160 implements a radio-frequency reflective object disposed on the exterior 146 of the satellite 140. In various embodiments, a single reflector 160 extends from the housing 142 of the satellite 140. In some embodiments, multiple reflectors 160 may be implemented. The reflector 160 is operational to redirect the transmit signal 158 toward the probe 122 and the reference horn 112 of the test bench 110. In various embodiments, the reflector 160 may bounce a main lobe of the transmit signal 158 (the test portion 166) in a first reflection 170 toward the probe 122 and bounce a side lobe of the transmit signal 158 (the reference portion 168) in a second reflection 172 toward the reference horn 112.

Figure 2:
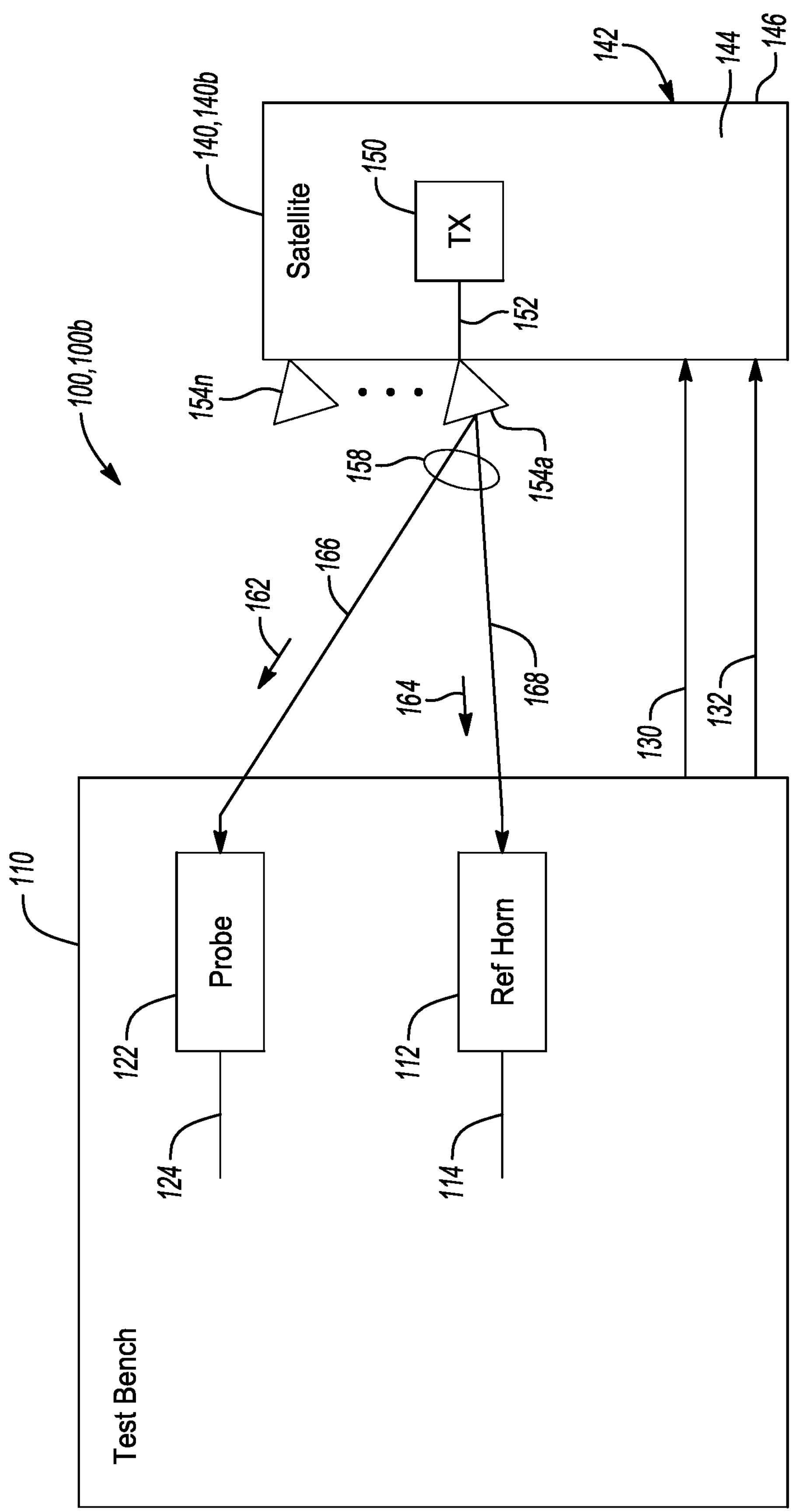
FIG. 2 is a schematic diagram of a test system involving a satellite without a reflector in accordance with one or more exemplary embodiments.

Referring to FIG. 2, a schematic diagram of an example test system 100 involving a satellite 140 without a reflector 160 is shown in accordance with one or more exemplary embodiments. The test system 100 (e.g., a second test system 100*b*) includes the test bench 110 and a satellite 140 (e.g., a second satellite 140*b*) that does not implement the reflector 160. The test bench 110 is the same as shown in FIG. 1. The satellite 140 includes the housing 142 and the transmitters 150 (one shown).

Each feed antenna 154*a*-154*n* implements a directional radio-frequency antenna mounted on the exterior 146 of the satellite 140. The antenna under test is operational to broadcast a source signal 152 as the transmit signal 158. The transmit signal 158 is directed toward the test bench 110. The satellite 140 may include over 100 to 400 individual feed antenna 154*a*-154*n*. The feed antennas 154*a*-154*n* have the feed polarization 156. In various embodiments, the feed polarization 156 may be a linear polarization or a circular polarization. The feed polarization 156 of the feed antennas 154*a*-154*n* is generally different than the probe polarization 126 and the horn polarization 116. While testing, the satellite 140 is oriented such that the main lobe (the test portion 166) of the transmit signal 158 is directed to the probe 122 of the test bench 110. A side lobe (the reference portion 168) of the transmit signal 158 is directed to the reference horn 112.

Figure 3:
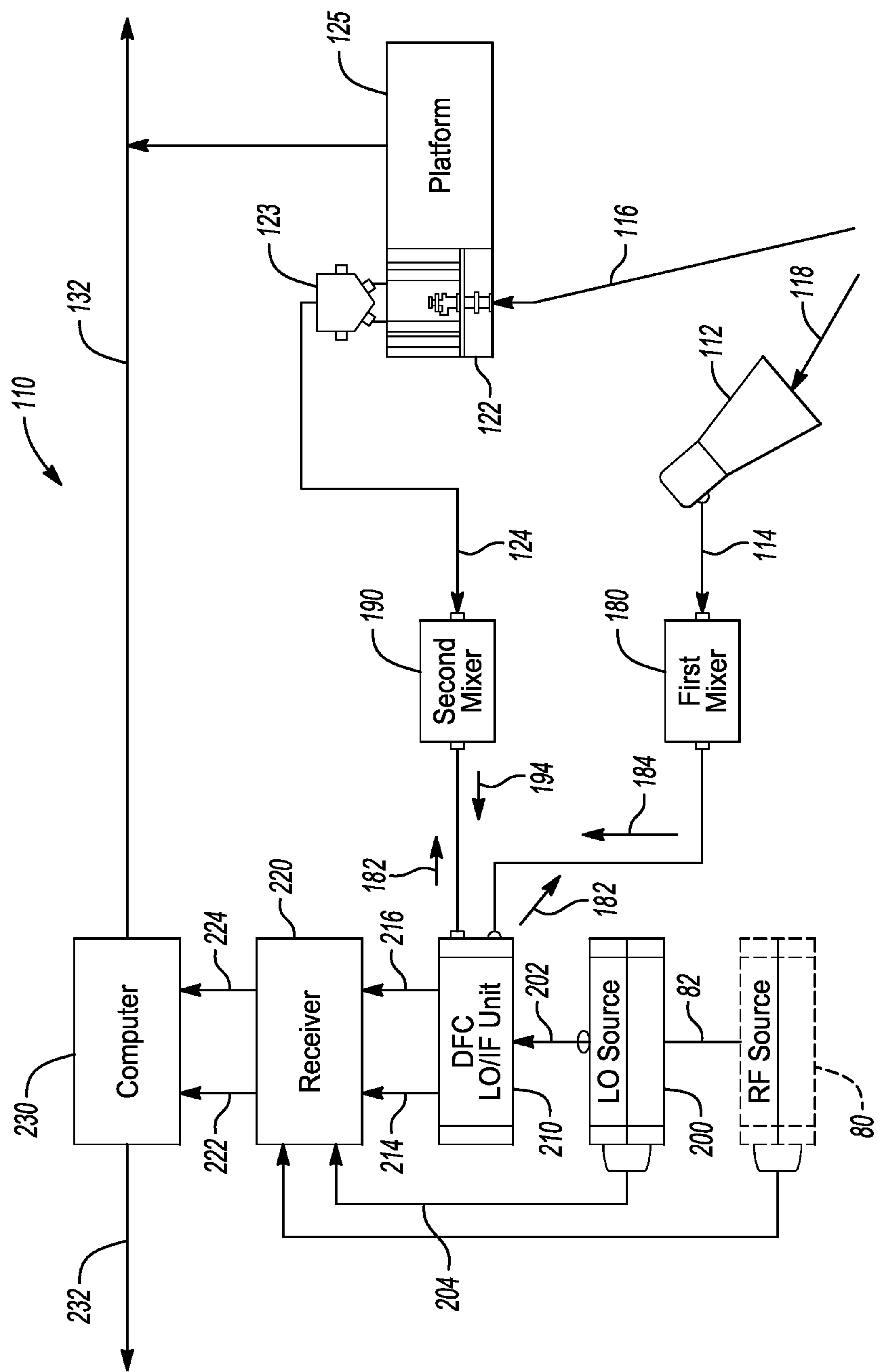
FIG. 3 is a schematic diagram of a test bench in accordance with one or more exemplary embodiments.

Referring to FIG. 3, a schematic diagram of an example implementation of the test bench 110 is shown in accordance with one or more exemplary embodiments. The test bench 110 generally includes the probe 122, the reference horn 112, a multiport switch 123, a moveable platform 125, a first mixer 180, a second mixer 190, a local oscillator (LO) source 200, a distributed frequency converter (DCF) 210, a receiver 220, and a computer 230. The test system 100 and the test bench 110 are characterized by a lack of an external radio-frequency source 80 that would otherwise generate a radio-frequency signal 82 used to create the source signal 152 outside the satellite 140.

A source oscillator signal 202 is generated by the local oscillator source 200 and presented to the distributed frequency converter. The distributed frequency converter 210 converts the source oscillator signal 202 to multiple copies of the local oscillator signal 182 that are routed to the first mixer 180 and the second mixer 190. The local oscillator signal 182 carries a steady oscillating signal used to mix the test signal 124 and the reference signal 114 to an intermediate frequency 218. The first mixer 180 generates an intermediate reference signal 184 received by the distributed frequency converter. The second mixer 190 generates an intermediate test signal 194 received by the distributed frequency converter.

A synchronization signal is generated by the local oscillator source 200 and transferred to the receiver 220. The synchronization signal provides a time reference for the receiver 220. The receiver 220 receives a final test signal 214 and a final reference signal 216 from the distributed frequency converter. An amplitude 222 is calculated by the receiver 220 and presented to the computer 230. The amplitude 222 is an amplitude of the transmit signal 158 presented by the feed horn (FIGS. 1 and 2). A phase 224 is calculated by the receiver 220 and provided to the computer 230. The phase 224 is a phase of the transmit signal 158 presented by the feed antennas 154*a*-154*n*. The computer 230 generates the control signal 132. Near-field pattern 232 information is generated by the computer 230. The near-field pattern 232 information represents a field pattern of the transmit signal 158 presented by the feed horn. The control signal 132 is received by the moveable platform 125 and the satellite 140 (FIGS. 1 and 2).

The multiport switch 123 implements a single-post four-throw pin switch. The multiport switch 123 is operational to route the test signal 124 from the probe 122 to the second mixer 190.

The first mixer 180 implements a frequency down converter. The first mixer 180 is operational to generate the intermediate reference signal 184 by a first mixing of the reference signal 114 with the local oscillator signal 182. The intermediate reference signal 184 is presented to the distributed frequency converter.

The second mixer 190 implements another frequency down converter. The second mixer 190 is operational to generate the intermediate test signal 194 by a second mixing of the test signal 124 with the local oscillator signal 182. In various embodiments, the second mixer 190 may be a copy of the first mixer 180. The intermediate test signal 194 is presented to the distributed frequency converter 210.

The local oscillator source 200 implements a radio-frequency oscillator. The local oscillator source 200 is operational to generate the source oscillator signal 202 and the synchronization signal 204.

The distributed frequency converter 210 implements a dual down converter. The distributed frequency converter 210 is operational to down convert the intermediate test signal 194 and the intermediate reference signal 184 to a predetermined frequency (e.g., 20 megahertz). The distributed frequency converter 210 generally includes a local oscillator/intermediate frequency (LO/IF) unit and two mixer modules. The intermediate reference signal 184 is converted into the final reference signal 216. The intermediate test signal 194 is converted into the final test signal 214. The final reference signal 216 and the final test signal 214 are transferred to the receiver 220.

The receiver 220 implements a measurement circuit. The receiver 220 is operational to determine the amplitude 222 and the phase 224 of the transmit signal 158 (FIGS. 1 and 2) based on the final test signal 214 relative to the final reference signal 216 received from the distributed frequency converter 210. The amplitude 222 and the phase 224 of the transmit signal 158 are determined by a comparison of the final test signal 214 with the final reference signal 216. The amplitude 222 and the phase 224 are presented to the computer 230.

The computer 230 implements one or more processors, each of which may be embodied as a separate processor, one or more application specific integrated circuits (ASIC) or field programmable gate arrays (FPGA), and/or dedicated electronic control circuitry. The computer 230 is operational to generate the control signal 132 that instructs the satellite 140 when to generate the transmit signal 158 and from which feed antenna 154*a*-154*n* and corresponding transmitter 150. The computer 230 is operational to control spatial movement of the probe 122 to multiple locations 242*a*-242*n* in front of the antenna under test. The computer 230 is also operational to determine the near-field pattern 232 information based on the amplitude 222 and the phase 224 as measured at the multiple locations 242*a*-242*n* of the probe 122.

The processors may be implemented in hardware, software executing on hardware, or a combination of both. The computer 230 include tangible, non-transitory memory (e.g., read-only memory in the form of optical, magnetic, and/or flash memory). For example, the computer 230 may include application-suitable amounts of random-access memory, read-only memory, flash memory and other types of electrically erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the computer 230 (either in the foreground or background). The computer 230 may receive commands and information, in the form of one or more input signals from the receiver 220 and the moveable platform 125. The computer 230 may also communicate instructions to the satellite 140.

Figure 4:
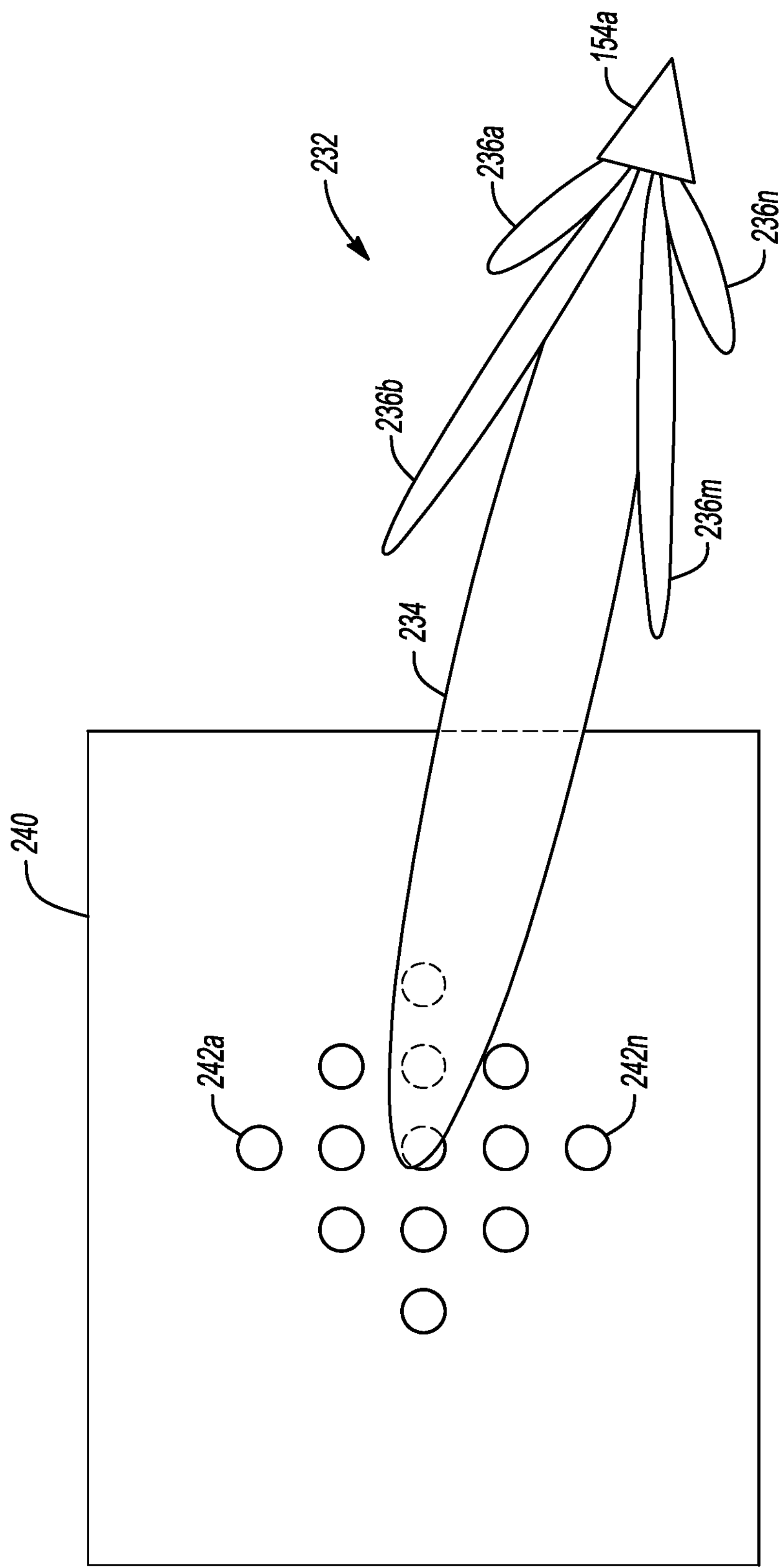
FIG. 4 is a schematic diagram of probe movement in accordance with one or more exemplary embodiments.

Referring to FIG. 4, a schematic diagram of an example probe movement is shown in accordance with one or more exemplary embodiments. The antenna under test (e.g., feed antenna 154*a* is illustrated) generate the transmit signal 158. The transmit signal 158 has a near-field pattern 232. A main lobe 234 of the near-field pattern 232 may be aligned with the feed antenna 154*a*. Multiple side lobes 236*a*-236*n* of the near-field pattern 232 may be spatially spread from the main lobe 234 in one or more directions.

The probe 122 measures the transmit signal 158 at the multiple locations 242*a*-242*n* in a scan plane 240, one location at a time. The probe 122 is moved spatially in the scan plane 240 from one location to another to measure the near-field pattern 232 from different points of view. Some of the measurements are of the main lobe 234. Other measurements capture the side lobes 236*a*-236*n*. The resulting test signals 124 may be transferred to the computer 230 via the second mixer 190, the distributed frequency converter 210 and the receiver 220. The computer 230 uses the resulting amplitude 222 and phase 224 information to reconstruct the near-field pattern 232 of the feed antenna 154*a*.

Referring to FIG. 5, a flow diagram of an example method 260 for testing a satellite 140 is shown in accordance with one or more embodiments. The method (or process) 260 is implemented by the test bench 110 and a satellite 140. The method 260 generally includes steps 262 to 286, as illustrated. The sequence of steps is shown as a representative example. Other step orders may be implemented to meet the criteria of a particular application.

In the step 262, electrical power is applied to the satellite 140. The computer 230 commands the satellite 140 via the control signal 132 to transmit from one of the feed antennas 154*a*-154*n* in the step 264. The satellite 140 generates the source signal 152 internally in the step 266 and presents the source signal 152 to a feed antenna 154*a*. The feed antenna 154*a* generates the transmit signal 158 in the step 268 by broadcasting the source signal 152 external to the satellite 140.

In the step 270, the test portion 166 of the transmit signal 158 is generated by a first reflection 170 of the transmit signal 158 from the reflector 160 in the first direction 162 toward the probe 122. The probe 122 converts the test portion 166 of the transmit signal 158 into the test signal 124 in the step 272. In the step 274, the reference portion 168 of the transmit signal 158 is generated by a second reflection 172 of the transmit signal 158 from the reflector 160 in a second direction 164 toward the reference horn 112. The reference horn 112 converts the reference portion 168 of the transmit signal 158 into the reference signal 114 in the step 276.

In the step 278, the first mixer 180 generates an intermediate reference signal 184 by a first mixing of the reference signal 114 to an intermediate frequency 218. In the step 280, the second mixer 190 generates an intermediate test signal 194 by a second mixing of the test signal 124 to the intermediate frequency 218. The distributed frequency converter 210 converts the intermediate test signal 194 and the intermediate reference signal 184 to the final test signal 214 and the final reference signal 216 in the step 282.

In the step 284, the receiver 220 determining an amplitude 222 and a phase 224 of the transmit signal 158 based on the final test signal 214 relative to the final reference signal 216. The amplitude 222 and the phase 224 of the transmit signal 158 are determined by comparing the final test signal 214 with the final reference signal 216. The method 260 is repeated per the step 284 for a next feed antenna (e.g., 154*b*) until the feed antennas 154*a*-154*n* have been processed.

Referring to FIG. 6, a flow diagram of an example method 300 for determining the near-field pattern 232 of a feed antenna 154*a* is shown in accordance with one or more embodiments. The method (or process) is implemented by the test bench 110 and a satellite 140. The method 300 generally includes steps 302 to 312, as illustrated. The sequence of steps is shown as a representative example. Other step orders may be implemented to meet the criteria of a particular application.

In the step 302, the probe 122 is placed at an initial location 242*a*-242*n* in the scan plane 240 (FIG. 4). The amplitude 222 and the phase 224 of the transmit signal 158 is determined in the step 304 at the initial location 242*a*-242*n*. The probe 122 is moved to a next location 242*a*-242*n* in the step 306. The test bench 110 repeats the determination of the amplitude 222 and the phase 224 at the next location 242*a*-242*n* in the step 308. If the transmit signal 158 is untested at one or more locations 242*a*-242*n* per the step 310, the method 300 return to the step 306 and moves the probe 122 to an untested location. Once the amplitude 222 and the phase 224 have been determined at each location 242*a*-242*n*, the computer 230 generates the near-field pattern 232 in the step 312.

The test bench 110 makes use of a stationary probe 122 while transmitters 150 in the satellite 140 is used to generate the source signals 152, instead of the external radio-frequency source 80, for near-field antenna measurements. Use of the satellite 140 transmitters 150 eliminates the usage of multiple couplers and radio-frequency cables thereby reducing a weight and a cost of the testing. Embodiments of the disclosure generally eliminate the implementation of test couplers, multiple radio-frequency cables, and multiple port radio-frequency switches.

This disclosure is susceptible of embodiments in many different forms. Representative embodiments of the disclosure are shown in the drawings and are herein described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for testing a feed antenna of a satellite comprising:

generating a source signal internal to the satellite, wherein the satellite includes the feed antenna disposed on an exterior of the satellite;

generating a transmit signal external to the satellite by a broadcast of the source signal with the feed antenna;

generating a test portion of the transmit signal by a first reflection of the transmit signal;

generating a test signal with a probe in response to a first reception of the test portion, wherein the probe is external to the satellite;

generating a reference portion of the transmit signal by a second reflection of the transmit signal;

generating a reference signal with a reference horn in response to a second reception of the reference portion, wherein the reference horn is external to the satellite; and determining an amplitude and a phase of the transmit signal based on the test signal relative to the reference signal.

2. The method according to claim 1, further comprising:

wherein the first reflection of the transmit signal is from a reflector in a first direction toward the probe, wherein the reflector is disposed on the exterior of the satellite; and wherein the second reflection of the transmit signal from the reflector in a second direction toward the reference horn, wherein the first direction is different than the second direction.

3. The method according to claim 1, wherein the second reception made by the reference horn is receiving a side lobe of the transmit signal.

4. The method according to claim 1, further comprising:

generating an intermediate reference signal by mixing the reference signal to an intermediate frequency; and generating an intermediate test signal by mixing the test signal to the intermediate frequency.

5. The method according to claim 4, wherein the amplitude and the phase of the transmit signal are determined by a comparison of the intermediate test signal with the intermediate reference signal.

6. The method according to claim 1, further comprising:

moving the probe to a plurality of locations;

repeating the determining of the amplitude and the phase of the transmit signal at the plurality of locations; and generating a near-field pattern of the feed antenna based on the amplitude and the phase of the transmit signal at the plurality of locations.

7. The method according to claim 1, wherein the reference horn and the feed antenna have different polarizations.

8. The method according to claim 1, wherein:

the satellite includes a feed antenna; and the broadcast from the feed antenna is tested with the probe and the reference horn.

9. The method according to claim 8, wherein:

the feed antenna is part of at least one-hundred feed antennas; and the satellite has at most a single reflector for the at least one-hundred feed antennas.

10. A test system comprising:

a transmitter internal to a satellite and operational to generate a source signal;

a feed antenna disposed on an exterior of the satellite and operational to generate a transmit signal external to the satellite by a broadcast of the source signal;

a probe external to the satellite and operational to generate a test signal in response to a first reception of a test portion of the transmit signal;

a reflector operational to:

generate the test portion of the transmit signal by a first reflection of the transmit signal in first direction;

generate a reference portion of the transmit signal by a second reflection of the transmit signal in second direction, and a reference horn external to the satellite and operational to generate a reference signal in response to a second reception of the reference portion of the transmit signal; and a receiver operational to determine an amplitude and a phase of the transmit signal based on the test signal relative to the reference signal.

11. The test system according to claim 10, wherein the second reception made by the reference horn is receiving a side lobe of the transmit signal.

12. The test system according to claim 10, further comprising:

a first mixer operational to generate an intermediate reference signal by mixing the reference signal to an intermediate frequency; and a second mixer operational to generate an intermediate test signal by mixing the test signal to the intermediate frequency.

13. The test system according to claim 12, wherein the amplitude and the phase of the transmit signal are determined by a comparison of the intermediate test signal with the intermediate reference signal.

14. The test system according to claim 10, wherein:

the probe is moved to a plurality of locations;

the determination of the amplitude and the phase of the transmit signal is repeated at the plurality of locations; and a near-field pattern of the feed antenna is based on the amplitude and the phase of the transmit signal at the plurality of locations.

15. The test system according to claim 10, wherein the reference horn and the feed antenna have different polarizations.

16. The test system according to claim 10, wherein:

the satellite includes a feed antenna; and the broadcast from the feed antenna is tested with the probe and the reference horn.

17. The test system according to claim 16, wherein:

the feed antenna is part of at least two-hundred feed antennas; and the satellite has at most a single reflector for the at least two-hundred feed antennas.

18. The test system according to claim 10, wherein the test system is characterized by a lack of a radio-frequency source external to the satellite, coupled to the satellite, and operational to generate a radio-frequency signal used to create the source signal transmitted by the satellite.

19. The test system according to claim 10, wherein the first reflection of the transmit signal is from a reflector in a first direction toward the probe, wherein the reflector is disposed on the exterior of the satellite; and wherein the second reflection of the transmit signal from the reflector in a second direction toward the reference horn, wherein the first direction is different than the second direction.

20. A test bench comprising:

a probe external to a satellite and operational to generate a test signal in response to a first reception of a test portion of a transmit signal broadcast by the satellite;

a reflector operational to:

generate the test portion of the transmit signal by a first reflection of the transmit signal in first direction, and generate a reference portion of the transmit signal by a second reflection of the transmit signal in a second direction;

a reference horn external to the satellite and operational to generate a reference signal in response to a second reception of the reference portion of the transmit signal broadcast by the satellite; and a receiver operational to determine an amplitude and a phase of the transmit signal based on a comparison of the test signal with the reference signal, wherein the test bench is characterized by a lack of a radio-frequency source external to the satellite, coupled to the satellite, and operational to generate a radio-frequency signal used to create a source signal transmitted by the satellite.

* * * * *